United States Patent

Byström et al.

[11] Patent Number: 5,924,826
[45] Date of Patent: Jul. 20, 1999

[54] CUTTING INSERT MOUNTED ON HOLDER BY RIB-AND-GROOVE COUPLING

[75] Inventors: Lennart Byström; Jörgen Wiman, both of Sandviken, Switzerland

[73] Assignee: Sandvik AB, Sandviken, Sweden

[21] Appl. No.: 08/738,839

[22] Filed: Oct. 28, 1996

Related U.S. Application Data

[63] Continuation of application No. PCT/SE95/00414, Apr. 18, 1995.

[30] Foreign Application Priority Data

Apr. 27, 1994 [CH] Switzerland .................. 9401429

[51] Int. Cl.⁶ .................................... B23B 27/16
[52] U.S. Cl. ............................... 407/103; 407/113
[58] Field of Search ...................... 407/103, 104, 407/113, 48, 101, 66; 403/333, 334, 104

[56] References Cited

U.S. PATENT DOCUMENTS

| | | | |
|---|---|---|---|
| 1,629,667 | 5/1927 | Knipple | 407/103 |
| 2,140,941 | 12/1938 | Reaney . | |
| 2,207,909 | 5/1940 | Besaw | 407/49 |
| 2,382,510 | 8/1945 | Seiter | 407/41 |
| 2,453,464 | 11/1948 | Sheridan . | |
| 3,829,943 | 8/1974 | Bartozevicz et al. | 407/103 |
| 4,437,802 | 3/1984 | Hall, Jr. . | |
| 4,561,683 | 12/1985 | Lumsden et al. | 403/334 |
| 4,573,832 | 3/1986 | Zinner | 407/113 |
| 5,028,175 | 7/1991 | Pawlik | 407/113 |
| 5,176,191 | 1/1993 | Owens | 407/41 |
| 5,658,101 | 8/1997 | Hammer | 407/37 |
| 5,810,518 | 9/1998 | Wiman et al. | 407/102 |

FOREIGN PATENT DOCUMENTS

| | | |
|---|---|---|
| 25 47 102 | 3/1983 | Germany . |
| 34 02 547 | 8/1985 | Germany . |
| 34 46 455 | 6/1986 | Germany . |
| WO98/11367 | 11/1989 | WIPO . |

*Primary Examiner*—Andrea L. Pitts
*Assistant Examiner*—Mark Williams
*Attorney, Agent, or Firm*—Burns, Doane, Swecker & Mathis, L.L.P.

[57] ABSTRACT

A cutting insert is mounted by a rib-and-groove connection on a holder. The grooves are formed in a bottom surface of the insert, and the ribs extend from a holding surface of the holder. The ribs and grooves include mutually convergent sides configured such that a gap is formed between the holding surface and bottom surface, and between a top of each rib and a bottom of a respective groove.

9 Claims, 2 Drawing Sheets

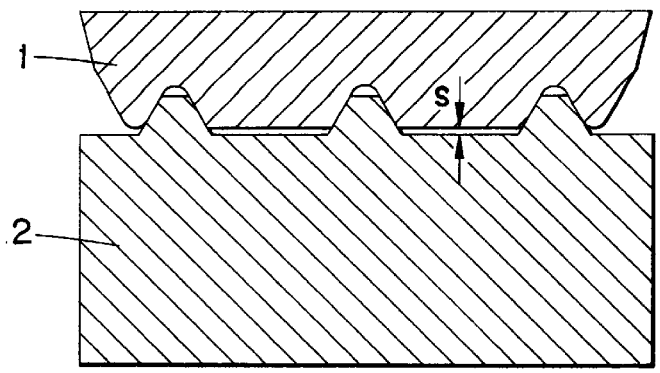
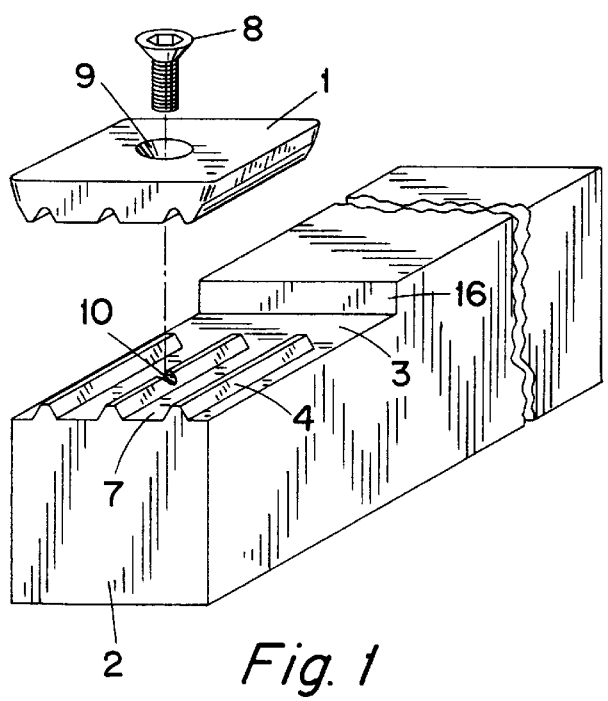
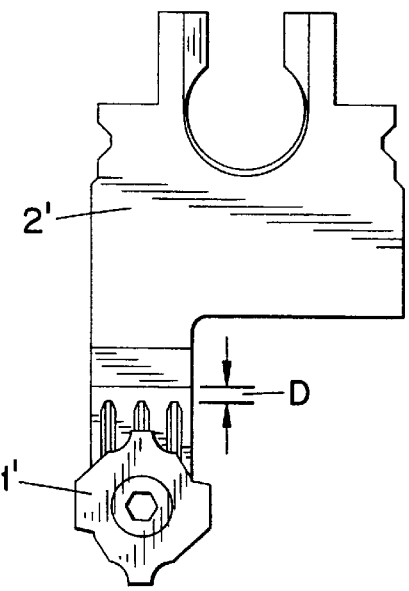

CUTTING INSERT MOUNTED ON HOLDER BY RIB-AND-GROOVE COUPLING

This is a Continuation of International application Ser. No. PCT/SE95/00414 filed Apr. 18, 1995, designating the United States.

BACKGROUND OF THE INVENTION

The present invention relates to an arrangement for the fastening of cutting inserts on insert holders for the cutting machining of primarily metals.

Different cutting inserts and indexable inserts are fastened on tool holders in several different, known ways. The most common is that the insert has a central through hole and the insert pocket in the holder has a threaded hole. A locking screw is inserted into the center hole of the insert and is screwed into the hole of the holder by a suitable torque. A shim with a center hole often is placed between the insert and the bottom support surface of the pocket.

Usually, the insert pocket also comprises two substantially perpendicular abutment surfaces, or three abutment points, for abutting against two of the insert's side surfaces. The disadvantage with this construction is that a certain play or looseness easily occurs after a certain time of use. A further drawback is that one may easily tighten the screw too much, thereby damaging it or even causing a rupture.

Other known insert holders have a clamp or similar fastening arrangement, that presses upon the upper side of the insert in order to clamp it in the insert pocket. The pressure of the clamp can be regulated by a screw. Such a construction may for instance be used for fastening cutting inserts having no central hole, which is the case for cutting-off inserts, for example.

In order to avoid play and attain a generally more stable fastening of a cutting insert, constructions have been suggested according to which the lower side of the cutting insert and the bottom support surface have been formed with ribs intended to mate with each other. Such a construction is disclosed in U.S. Pat. No. 2,140,941 and another in U.S. Pat. No. 2,453,464. However, a drawback of these constructions is that they necessitate a very considerable amount of grinding of the ribbed surface of either the cutting insert or the holder, or both. A further drawback is that, even if the ribs secure the insert in a lateral direction a vertical play may arise in these constructions just as easily as in the case of two wholly planar abutment surfaces, particularly during machining operations that generate vibration.

In U.S. Pat. No. 4,437,802 it is described how a cutting insert is fastened on a drill, the cutting insert comprising two grooves, and the support surface of the drill comprising two corresponding ribs which are to fit exactly into the grooves and occupy their whole cross-sectional area. Again, the problem is that an axial play may easily arise, particularly if the drill is subjected to vibrations. Moreover, a considerable grinding is required either of the ribs or of the grooves, in order to attain the necessary dimensional accuracy.

Thus, a primary object of the present invention is to provide an arrangement for obtaining a stable and play-free fastening of cutting inserts on insert holders, for instance in the case where the insert is to be submitted to vibrations for a relatively long time.

A second object of the present invention is to attain a stable and play-free fixing of cutting inserts on insert holders without any costly and time-consuming grinding.

A third object of the present invention is to avoid the necessity of providing abutment surfaces or points in the insert pocket, which require a high dimension accuracy.

SUMMARY OF THE INVENTION

These and other objects have been achieved by forming a bottom surface of an insert with substantially parallel grooves, and forming a holding surface of the holder with substantially parallel ribs which fit into the grooves such that there exists a gap between the bottom surface of the insert and the holding surface of the holder.

Also, it is preferable that tops of the ribs are out of contact with bottoms of the grooves, and that the ribs and grooves have correspondingly converging sides.

BRIEF DESCRIPTION OF THE DRAWINGS

Some preferred embodiments of the invention will now be further described with reference to the appended drawings. These are presented herewith.

FIG. 1 is an exploded top perspective view of a holding arrangement according to the present invention;

FIG. 2 is a cross-section of a cutting insert and holder according to FIG. 1;

FIG. 3 is a top plan view through the insert and insert holder depicted in FIG. 1;

DETAILED DESCRIPTION OF PREFERRED EMBODIMENTS OF THE INVENTION

Figure 4:
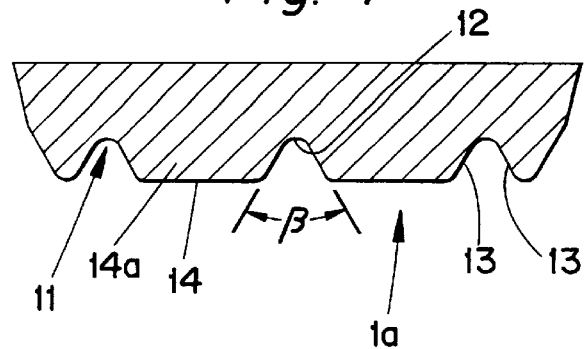
FIG. 4 is a cross sectional view through the insert of FIG. 1.
Figure 5:
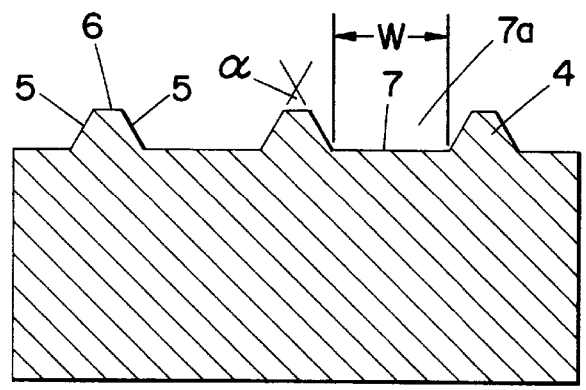
FIG. 5 is a cross sectional view through the holder of FIG. 1.

In the figures, a cutting insert is designated by 1 or 1' and a holder by 2 or 2'. The cutting insert is made of a suitable hard material, such as coated or uncoated cemented carbide. Also some ceramics and cubic boron nitride may be used. The invention is mainly intended for different turning applications, such as longitudinal turning, copying, grooving and parting-off, but it may advantageously also be used for the fastening of milling cutting inserts.

The upper front part of the holder 2 is provided with a holding surface 3. On the holding surface are provided elongated ribs 4, which are substantially parallel to one another. According to FIG. 1, the ribs extend backwardly from the front surface of the holder substantially parallel with the longitudinal extension of the holder. However, in principle the parallel ribs may extend in any arbitrary direction, for instance perpendicularly to the one shown in FIG. 1. At least the parts of the ribs 4 which come into engagement with the insert have a basically constant cross-sectional geometry. This geometry has the form of a trapezoid or more precisely, the form of a truncated, equal-sided triangle, whose shape is defined by two side surfaces 5 and a top surface 6. The transition between a side surface 5 and the holding surface 3 is accomplished either along a distinct break line or along a fillet with a small radius, which should be located outside the contact area with the cutting insert 1, 1'. The top angle $\alpha$ of the ribs is preferably between 40 and 80°, more preferably between 50 and 70° and most preferably between 55 and 65°. Between the ribs extend grooves 7a of the holding surface 3, which have bottom surfaces 7 that are substantially planar and have a width W that is preferably between 1 and 4 times the base width of the ribs, more preferably between 1½ and 2½ times. The ribs may extend the whole way to the rear border line of the holding surface; however, due to production-technical reasons it is suitable that the ribs terminate a distance D before this border line, preferably via a short transition part where the height of the ribs gradually decreases and finally disappears.

The cutting insert 1, 1' is fastened by a locking screw 8, which is first introduced through the insert's central hole 9 and is then screwed into a threaded hole 10 in the holder 2. Suitably, the center line of this hole 10 intersects the longitudinal center line of a rib. The bottom side surface 1a of this insert is formed with substantially parallel grooves 11 intended to accommodate the ribs 4. An essential feature of this invention is that these grooves 11 are directly press-formed before the sintering of the cemented carbide (or other hard material) and thus are not ground into the insert. The grooves 11 have a sector angle β which exactly corresponds to the top angle α of the ribs or that is somewhat smaller than angle α, however not by more than about 2°, preferably 1°. For production-technical reasons, the top surfaces 12 of the grooves are preferably rounded; of course the rounded top surfaces 12 should not engage the tops 6 of the ribs, so that the side surfaces 13 of the grooves 11 will be in contact only with the side surfaces 5 of the ribs. The grooves 11 are separated by ribs 14a which are received in respective grooves 7a. Each rib 14a has a cross sectional shape of a truncated triangle. Bottoms 14 of the ribs 14a are spaced from bottoms 7 of the grooves 7a by a gap S. The transition of the grooves 11 with the bottom surfaces 14 takes place along either a sharp break line or along a small radius. The side surfaces 13 should be completely planar in order to attain a good contact with the side surfaces 5 of the ribs.

As mentioned above, the cutting inserts are directly press-formed in their entirety, including the grooves 11. Thus, the surface structure in the grooves will have a certain rugosity which would disappear if the grooves were instead formed by grinding. The dimensions obtained after sintering and cooling are thereafter taken as set values for the production of the ribs of the holder. Some grinding of these ribs may be cost-permissive since a holder is used for a large number of cutting inserts.

When fastening the cutting insert, the insert is placed onto the ribs 4 in accordance with FIGS. 1 to 5 and is fastened by the screw 8. At this occasion, it is an essential feature of the present invention that no contact arises between the bottoms 14 of the ribs 14a and the bottoms 7 of surface 3 of the holder. As may be seen in FIG. 2, there is thus a gap s formed between said surfaces 7 and 14. This gap is greater than zero and lies within the size range of 0.02 to 0.2 mm. Further, it is an essential feature of the present invention that the tops 6 of the ribs do not reach the tops 12 of the grooves, as is apparent from FIG. 2. As a result of those two essential features, a squeezing wedge effect is made possible between the side surfaces 5 and 13 of the ribs and grooves, respectively, when the locking screw 8 is tightened. This wedge effect results in a fastening of the insert with a hitherto unattained stability and strength. Thus, for most applications, the need for abutment surfaces and abutment points between the insert and upright wall 16 of the holder becomes unnecessary, as is apparent from FIGS. 1 and 3. This simplifies the production of the insert pocket. Moreover, the slight surface rugosity of the directly pressed grooves positively influences the strength and endurance of the fixation.

Although it does not constitute a preferred embodiment of the present invention, the cutting insert may also be fastened with a suitable clamping arrangement instead of a screw. In this case, the pressure point of the clamp should be situated immediately above the middle groove.

After an operative cutting edge has been worn out, the insert may be loosened and turned 180° around the central axis of the screw 8, in order to index a new cutting edge.

As may be seen primarily in FIG. 1, the threaded hole 10 of the holder extends through the middle rib. The reason for the hole being located in that fashion instead of for instance through a section 7 disposed between two ribs, is that the insert may snap if it is submitted to a force between two support lines. In order to impart to the insert a symmetrical fastening force on both sides of the middle groove, the insert and the holder, are shaped with an uneven number of grooves and ribs.

Figure 6:
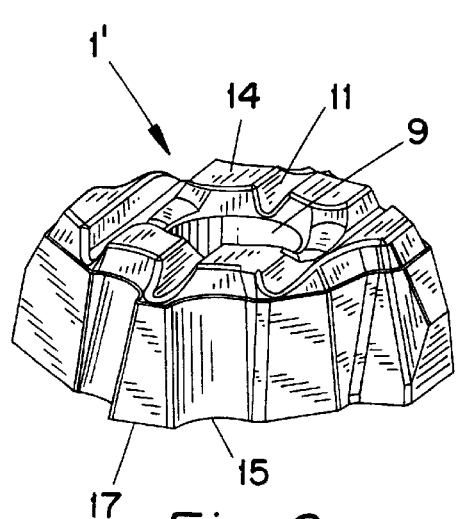
FIG. 6 is a perspective view of the bottom side of the cutting insert depicted in FIG. 1.
Figure 7:
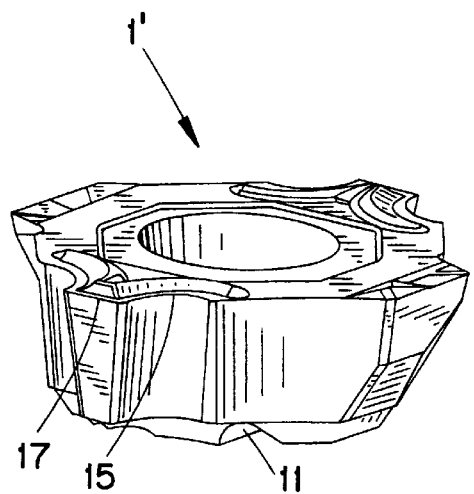
FIG. 7 is a top perspective view of the cutting insert shown in FIG. 6.

A cutting insert that has been formed in accordance with the present invention is well adapted to absorb both axial and radial forces. As an example, the invention can be used for making double-functional inserts in accordance with FIGS. 3, 6 and 7. Due to the straight front cutting edge 17 of this insert, and the curved side cutting edge 15 disposed adjacent to both sides of the front cutting edge, this insert may be used for transverse turning and also for axial copying, and as a form insert for radial turning. Thereby, a large number of different contours may be obtained.

Although not necessary, for certain applications with very large radial cutting forces, the ribs and grooves according to the invention may be combined with a rear support surface for the cutting insert, such as the surface 16 in FIG. 1.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In combination, a holder, and a cutting insert seated atop the holder;

the holder including an upwardly facing holding surface including upwardly projecting parallel first ribs; each first rib including a pair of first side surfaces converging upwardly toward a top of the respective first rib; adjacent ones of the first ribs spaced apart by upwardly open first grooves disposed in the holding surface, each first groove including sides diverging upwardly from a bottom of a respective first groove and defined by the first side surface of the adjacent first ribs;

the cutting insert including a downwardly facing bottom surface seated on the holding surface; the bottom surface including a plurality of downwardly open second grooves; each second groove including a pair of second side surfaces diverging downwardly from a top of a respective second groove; adjacent ones of the second grooves spaced apart by downwardly projecting second ribs disposed on the bottom surface; each second rib including sides converging downwardly toward a bottom of a respective second rib and defined by the second side surfaces of the respective adjacent second grooves; each second groove having a maximum width at the bottom surface, adjacent second grooves being spaced apart by a distance; a ratio of the distance to the maximum width being at least about 1:1 and no more than 4:1;

the first ribs received in respective ones of the second grooves, and the second ribs received in respective ones of the first grooves; the second side surfaces supported on the first side surfaces; the tops of the first ribs spaced below the tops of the respective second grooves, and the bottoms of the second ribs spaced above the bottoms of respective first grooves, whereby contact between the bottom surface and the holding surface occurs only where the first side surfaces of the first ribs engage the second side surfaces of the second grooves to produce a wedging effect therebetween.

2. The combination according to claim 1, further including a fastener for applying a downward force on the cutting insert to push the second side surfaces against the first side surfaces.

3. The combination according to claim 2 wherein the holding surface includes a threaded hole formed therein; the cutting insert including a through-hole extending therethrough; the fastener including a screw extending through the through-hole and threaded into the threaded hole.

4. The combination according to claim 3 wherein there is an odd number of first ribs, the threaded hole extending through a central one of the first ribs.

5. The combination according to claim 1 wherein the first ribs define respective longitudinal axes; the holding surface terminating at an edge; the cutting insert projecting past the edge in a direction parallel to the axes.

6. The combination according to claim 5 wherein the holding surface includes a threaded hole formed therein; the cutting insert including a through-hole extending therethrough; the combination further including a fastener screw extending through the through-hole and threaded into the threaded hole.

7. The combination according to claim 1 wherein each of the first and second ribs is shaped as a truncated triangle in cross section.

8. A cutting insert adapted to be fastened on a ribbed supporting surface, the insert comprising a top surface and a bottom surface, the top surface having cutting edges; the bottom surface including parallel grooves separated by parallel truncated ribs each groove; including side surfaces diverging toward the bottom surface; each rib including side surfaces converging downwardly toward the bottom surface and defined by the side surfaces of adjacent ones of the grooves; each groove having a maximum width at the bottom surface; adjacent grooves being spaced apart by a distance; a ratio of the distance to the maximum width being at least about 1:1 and no more than about 4:1.

9. The cutting insert according to claim 8 wherein a through hole extends completely therethrough from the top surface to the bottom surface and adapted to receive a fastening screw.

* * * * *

UNITED STATES PATENT AND TRADEMARK OFFICE
CERTIFICATE OF CORRECTION

PATENT NO.  :  5,924,826

DATED  :  July 20, 1999

INVENTOR(S)  :  Lennart BYSTRÖM and Jörgen WIMAN

It is certified that error appears in the above-identified patent and that said Letters Patent is hereby corrected as shown below:

On the Title Page : Item   -

[75] Inventors: please delete "Switzerland" and insert therefor --Sweden--

Signed and Sealed this

Thirteenth Day of March, 2001

*Attest:*

NICHOLAS P. GODICI

*Attesting Officer*    *Acting Director of the United States Patent and Trademark Office*